United States Patent
Bachmaier et al.

(10) Patent No.: US 9,755,495 B2
(45) Date of Patent: Sep. 5, 2017

(54) MAGNETIC RELUCTANCE COUPLING HAVING TWO ROTORS

(71) Applicant: SIEMENS AKTIENGESELLSCHAFT, Munich (DE)

(72) Inventors: Georg Bachmaier, Munich (DE); Christian Bachmann, Munich (DE); Dominik Bergmann, Sachsenkam (DE); Matthias Gerlich, Munich (DE); Andreas Goedecke, Munich (DE); Guillaume Pais, Munich (DE); Wolfgang Zoels, Munich-Lochhausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 326 days.

(21) Appl. No.: 14/388,613

(22) PCT Filed: Feb. 14, 2013

(86) PCT No.: PCT/EP2013/052955
§ 371 (c)(1),
(2) Date: Sep. 26, 2014

(87) PCT Pub. No.: WO2013/143766
PCT Pub. Date: Oct. 3, 2013

(65) Prior Publication Data
US 2015/0061439 A1 Mar. 5, 2015

(30) Foreign Application Priority Data
Mar. 28, 2012 (DE) .................. 10 2012 204 979
Apr. 18, 2012 (DE) .................. 10 2012 206 345

(51) Int. Cl.
*H02K 49/10* (2006.01)
*H02K 49/06* (2006.01)

(52) U.S. Cl.
CPC ........... *H02K 49/106* (2013.01); *H02K 49/06* (2013.01); *H02K 49/10* (2013.01)

(58) Field of Classification Search
CPC ....... H02K 49/06; H02K 49/10; H02K 49/106
(Continued)

(56) References Cited

U.S. PATENT DOCUMENTS 1,748,753 A 2/1930 Bowie
3,025,420 A * 3/1962 McCourt ............... H02K 49/00
310/103

(Continued)

FOREIGN PATENT DOCUMENTS

DE 2 306 761 5/1974
DE 10 2012 204 979.7 3/2012
(Continued)

OTHER PUBLICATIONS

Hyperphysics, "permanent magnets", gsu.edu, 2007.*
(Continued)

*Primary Examiner* — John K Kim
(74) *Attorney, Agent, or Firm* — Slayden Grubert Beard PLLC (57) ABSTRACT

A simplified magnetic reluctance coupling for coupling a first shaft to a second shaft, has a hollow cylindrical stator which has at least one magnet that is/are distributed around the circumference of the stator. The reluctance coupling also has a first rotor, which is supported in such a way that it can rotate within the stator, is connected to a first shaft in a rotationally fixed manner, and has a plurality of ferromagnetic first portions distributed around the circumference thereof and spatially separated from one another, as well as
(Continued)

a second rotor, which is supported in such a way that it can rotate within the first rotor, is connected to the second shaft in a rotationally fixed manner, and has a plurality of ferromagnetic second portions distributed around the circumference thereof.

12 Claims, 5 Drawing Sheets

(58) Field of Classification Search
USPC .... 310/89, 103, 106, 114, 216.114, 215.075, 310/216.107
See application file for complete search history.

(56) References Cited

U.S. PATENT DOCUMENTS

| | | | | |
|---|---|---|---|---|
| 3,301,091 A * | 1/1967 | Reese | ................ | H02K 49/102 310/103 |
| 3,943,391 A | 3/1976 | Fehr | | |
| 7,781,930 B2 * | 8/2010 | Abe | .................... | H02K 16/02 310/103 |
| 2004/0061409 A1 * | 4/2004 | Grant | ................ | H02K 15/024 310/216.057 |
| 2010/0052438 A1 * | 3/2010 | Akutsu | ............... | H02K 16/02 310/46 |
| 2011/0121672 A1 * | 5/2011 | Calverley | ............... | H02K 1/08 310/103 |
| 2011/0127869 A1 * | 6/2011 | Atallah | ............... | H02K 49/06 310/94 |
| 2012/0194021 A1 * | 8/2012 | Nakatsugawa | ...... | H02K 49/102 310/103 |
| 2012/0217848 A1 * | 8/2012 | Holopainen | ............ | H02K 5/15 310/410 |
| 2013/0002075 A1 * | 1/2013 | Edwards | ................ | H02K 49/06 310/103 |
| 2013/0002076 A1 * | 1/2013 | Iwasaki | ................ | H02K 49/102 310/103 |
| 2015/0061439 A1 * | 3/2015 | Bachmaier | ............ | H02K 49/10 310/103 |

FOREIGN PATENT DOCUMENTS

| | | |
|---|---|---|
| DE | 10 2012 206 345.5 | 4/2012 |
| FR | 2 498 840 | 7/1982 |
| GB | 1165137 | 9/1969 |
| JP | 2009-95173 | 4/2009 |
| WO | WO 00/03472 A1 | 1/2000 |

OTHER PUBLICATIONS

Chinese Office Action, Application No. 201380016927.8, 15 pages, Feb. 3, 2016.
German Office Action for German Priority Patent Application No. 10 2012 206 345.5, issued Dec. 15, 2014, 6 pages.
International Search Report mailed Jul. 24, 2014 in corresponding International Patent Application No. PCT/EP2013/052955.
PCT/EP2013/052955, Feb. 14, 2013, Georg Bachmaier et al., Siemens Aktiengesellschaft.
German language translation of Japanese Office Action for related Japanese Patent Application No. 2015-502164, issued Nov. 9, 2015, 5 pages.

* cited by examiner

//  MAGNETIC RELUCTANCE COUPLING HAVING TWO ROTORS

CROSS REFERENCE TO RELATED APPLICATIONS

This application is based on and hereby claims priority to International Application No. PCT/EP2013/052955 filed on Feb. 14, 2013, German Application No. 10 2012 204 979.7 filed on Mar. 28, 2012, and German Application No. 10 2012 206 345.5 filed on Apr. 18, 2012, the contents of which are hereby incorporated by reference.

BACKGROUND

The present invention relates to a magnetic reluctance coupling for coupling a first shaft to a second shaft.

Numerous solutions for magnetic couplings exist. They are almost all based on magnetic fields generated by permanent magnets. The simplest embodiment of a magnetic coupling consists of two rotating magnets arranged opposite one another. This provides a contactless, but inseparable coupling. If one side of this coupling realized with permanent magnets is replaced by a rotary field winding, the coupling may also be made switchable. However, the complexity is increased significantly. This is so particularly because power is transferred to the rotating shaft inductively or with the aid of sliding contacts.

The magnetic coupling between two rotating shafts that can transmit a torque in a manner controlled by applying an electric current is however advantageous for numerous applications. Forces can be transmitted contactlessly as and when required. If in particular the magnetic field is switched off by electrical activation, an open coupling is realized.

SUMMARY

One possible object is consequently to allow a coupling of two shafts to be realized more simply.

The inventors propose a magnetic reluctance coupling for coupling a first shaft to a second shaft, comprising a hollow-cylindrical stator having one or more magnets, which is/are arranged distributed around the circumference of the stator, a first rotor, which is mounted rotationally movably within the stator, is connected rotationally fixedly to the first shaft and has a plurality of ferromagnetic first portions arranged distributed around the circumference thereof and separated from one another, and a second rotor, which is mounted rotationally movably within the first rotor, is connected rotationally fixedly to the second shaft and has a plurality of ferromagnetic second portions arranged distributed around the circumference thereof.

In an advantageous way, the magnetic reluctance coupling is therefore realized essentially by three components, to be specific a stator, a first rotor and a second rotor, of which only the stator must have one or more magnets. The first and second rotors, which are connected to the two shafts, merely have to be produced at least partially from ferromagnetic material. This allows the shafts or rotors to be easily exchanged, without magnets being required.

The stator preferably has two ferromagnetic rings, which are arranged coaxially one behind the other and between which the magnet or magnets is/are arranged. This allows the magnetic field to be introduced into the first rotor and led out from it in any angular position.

It is also particularly advantageous if the magnet or plurality of magnets respectively is/are electromagnets. In this way it is possible that the magnetic reluctance coupling is electrically controllable. In particular, the torque that is transmitted between the first and second shafts can thus be electrically influenced.

Each of the electromagnets may have a ferromagnetic core, which represents a connecting piece between the two ferromagnetic rings, so that there is an uninterrupted ferromagnetic connection between the two ferromagnetic rings. This produces a very small magnetic resistance between the two ferromagnetic rings arranged coaxially one behind the other.

In one embodiment, each of the first portions of the first rotor is formed as a bar and has three subportions, of which a first subportion and a second subportion consist of ferromagnetic material and are arranged radially underneath the two ferromagnetic rings, and a third subportion consists of a non-magnetic material and is arranged axially between the first subportion and the second subportion. By the first and second subportions of the first portion of the first rotor, the magnetic field is directed radially inwardly out of the rings and led radially outwardly into the rings.

The first rotor may have a disk-shaped holding element, on the one side of which the first shaft and on the opposite, other side of which the first portions are fastened. In this way, torque can be transmitted from the first portions of the first rotor to the first shaft.

The second rotor preferably has the same axial length as the first rotor, and this axial length corresponds to the axial length of the stator. As a result, a magnetic reluctance coupling that is as compact and efficient as possible is produced.

The second portions of the second rotor may be arranged in star form around the axis of rotation of the second rotor. Consequently, the second portions touch in the middle of the second rotor, i.e. at the axis of rotation. As a result, the radially incoming magnetic fluxes are led into the center and deflected axially or deflected radially and led to the outside.

The windings of the electromagnets of the stator are preferably connected in series. As a result, the same electric current is obtained through all of the windings of the electromagnets, whereby simple control of the magnetic resonance coupling can be realized.

Also provided is a coupling arrangement having the magnetic reluctance coupling mentioned and a control device, with which the magnetic reluctance coupling can be activated in such a way that, in a coupling-engaging state, a first magnetic field in the first and second rotors is directed in a first direction and, immediately after ending the coupling-engaging state by current pulses, a second magnetic field can be formed in a second direction, opposite to the first direction, in the first and second rotors for the demagnetization thereof. In this way it can be ensured that, after the coupling-engaging state, a residual magnetization in the rotors, and possibly also in the stator, is reduced, so that, in a coupling-disengaging state, no torque is actually transmitted any longer between the first rotor and the second rotor. Consequently, the two shafts are completely decoupled.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
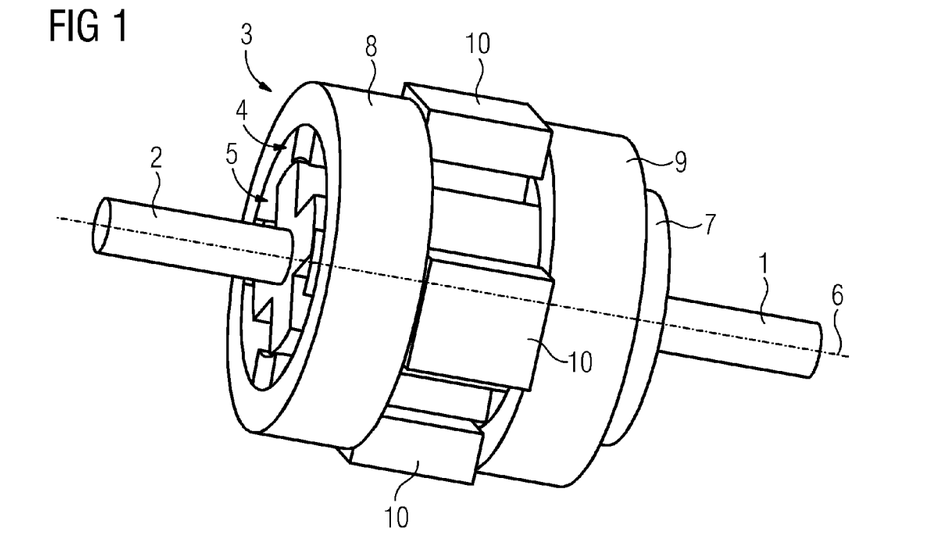
FIG. 1 shows a perspective view of a proposed magnetic reluctance coupling that is given by way of example.

FIG. 1 shows by way of example a magnetic reluctance coupling in a three-dimensional view. The magnetic reluctance coupling serves for coupling a first shaft 1 to a second shaft 2. It has a stator 3, which has an approximately tubular or hollow-cylindrical shape. Inside the stator 3, a first rotor 4 is rotatably mounted. This rotor 4 is connected rotationally fixedly to the first shaft 1. Inside the first rotor 4, a second rotor 5 is mounted rotationally movably. The second shaft 2 is fixed on said second rotor in a rotationally fixed manner.

The two shafts 1 and 2 are arranged coaxially with respect to the axis of rotation 6. The first shaft 1 protrudes from the one end face of the magnetic reluctance coupling and the second shaft 2 protrudes from the opposite other end face. The axis of rotation 6 consequently forms the rotational center of the first rotor 4 and of the second rotor 5. In addition, it represents the center axis of the tubular stator 3.

Figure 2:
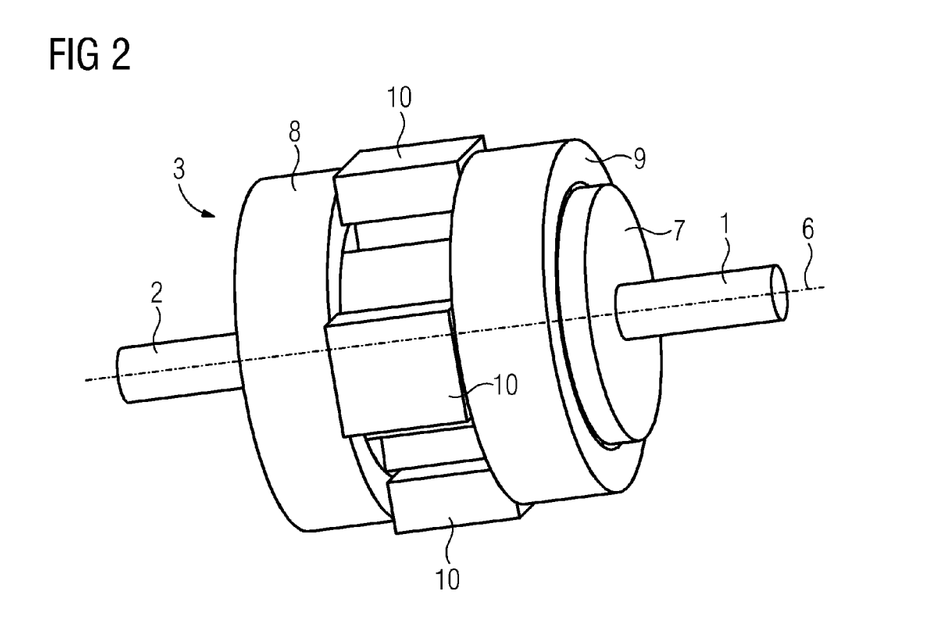
FIG. 2 shows the magnetic reluctance coupling of FIG. 1 from a different perspective.

While FIG. 1 shows the magnetic coupling rather more from the side of the second shaft 2, FIG. 2 shows the magnetic reluctance coupling rather more from the side of the shaft 1. This view particularly reveals a disk-shaped holding element 7 of the first rotor 4, which is fastened rotationally fixedly on the first shaft 1. The disk-shaped holding element 7 is rotationally symmetrical with respect to the axis of rotation 6.

As FIGS. 1 and 2 show, the stator 3 has two ferromagnetic rings 8 and 9, which preferably have the same geometry. These two ferromagnetic rings 8 and 9 are arranged coaxially and have the common axis 6. They are spaced apart from one another. Between them there are a plurality of magnets distributed uniformly around the circumference, in the present example electromagnets with windings 10.

The magnets may be permanent magnets, which generate a fixed magnetic field, whereby prescribed coupling properties between the first shaft 1 and second shaft 2 are obtained. However, the magnets are preferably electromagnets, which are electrically controllable. In particular, such electromagnets are also able to be switched off, so that then the shafts 1 and 2 are decoupled from one another.

Figure 3:
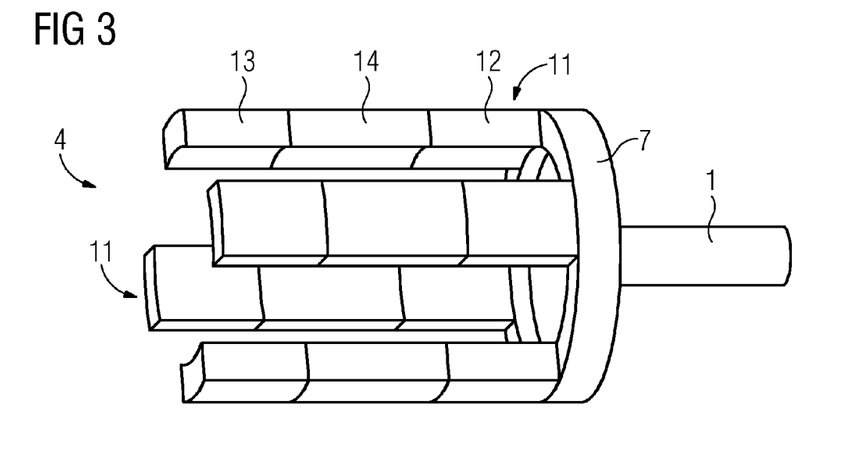
FIG. 3 shows the outer, first rotor of the magnetic reluctance coupling.

Before the operating mode of the magnetic reluctance coupling is explained, first the structure of the magnetic reluctance coupling is presented in detail on the basis of FIGS. 3 to 6. Thus, FIG. 3 shows the outer, first rotor 4. As already mentioned, it has the disk-shaped holding element 7.

On one side of the holding element 7, the shaft 1 is fixed in the middle in a rotationally fixed manner. In this example, the shaft 1 ends at the holding element 7 and does not protrude through it. On the side of the disk-shaped holding element 7 opposite from the shaft 1, bar-shaped first portions 11 are fastened. Their longitudinal axis extends parallel to 11. They are arranged on the outer periphery of the holding element 7 uniformly distributed in the circumferential direction.

Each individual bar-shaped first portion 11 is divided in the longitudinal direction 3. It has a proximal first subportion 12, a distal, second subportion 13 and a third subportion 14, lying in between. The first subportion 12 and the second subportion 13 consist of a ferromagnetic material, while the third subportion 14, lying in between, is produced from a non-magnetic material.

In the present case, the first rotor 4 has four first portions 11. The number of first portions may however also be chosen to be greater or less, for example 1, 2, 3, 5, 6, etc.

Figure 4:
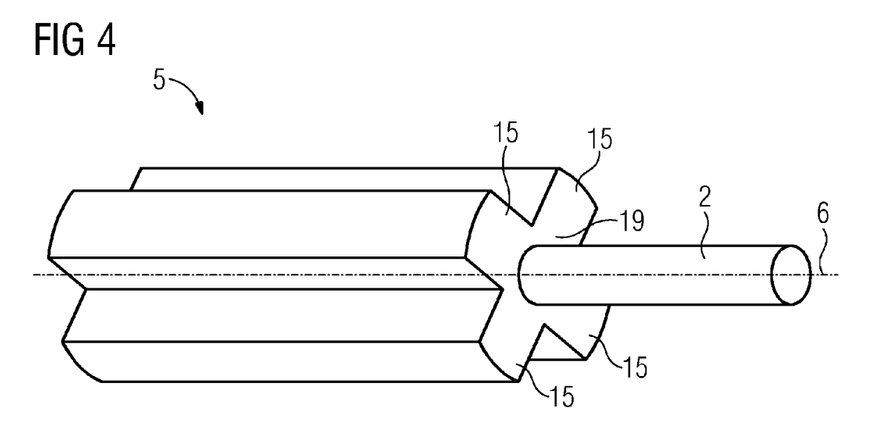
FIG. 4 shows the inner, second rotor of the magnetic reluctance coupling.

FIG. 4 shows the inner, second rotor 5. It has ferromagnetic, second portions 15 protruding outwardly in star form from the axis 6. They extend to the same extent in the longitudinal direction, e.g., in the direction of the axis 6, as the first portions 11 of the first rotor 4. The second rotor 5 may be formed in one piece, so that the second portions 15 merge with one another at the center, e.g., in the region of the axis 6. On the one end face of the second rotor 5, the second shaft 2 is fastened in a rotationally fixed manner.

Figure 5:
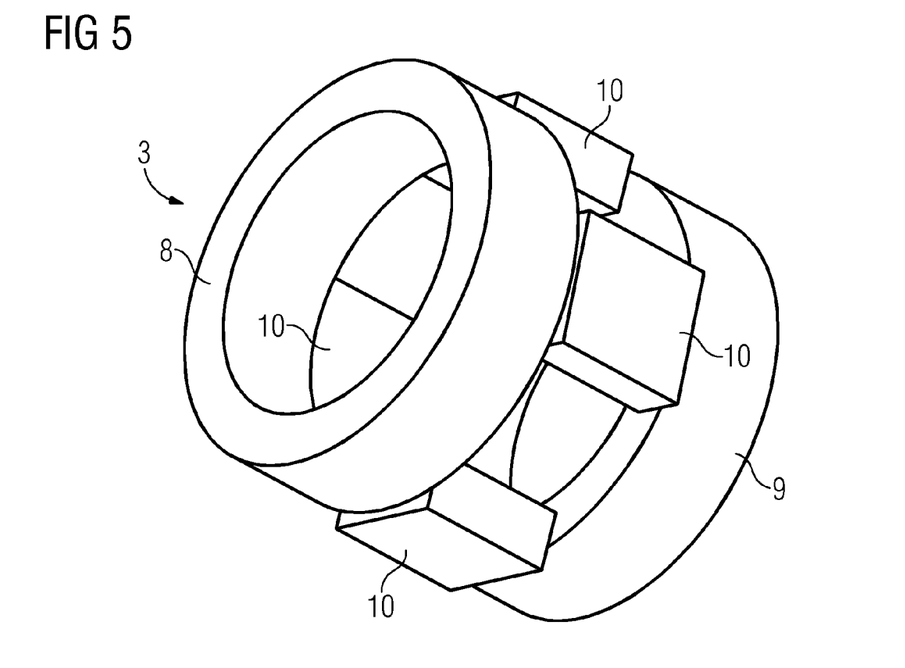
FIG. 5 shows the stator of the reluctance coupling with windings.

FIG. 5 shows the stator 3 in the uninstalled state. Between the two rings 8 and 9 are the electromagnets, of which only the windings 10 can be seen here. The electromagnets are uniformly distributed around the circumference of the stator 3. They do not protrude into the interior of the stator 3, which is defined by a cylinder that is bounded by the inner surfaces of the two rings 8 and 9. The winding axes of the windings 10 run parallel to the center axis of the stator 3.

Figure 6:
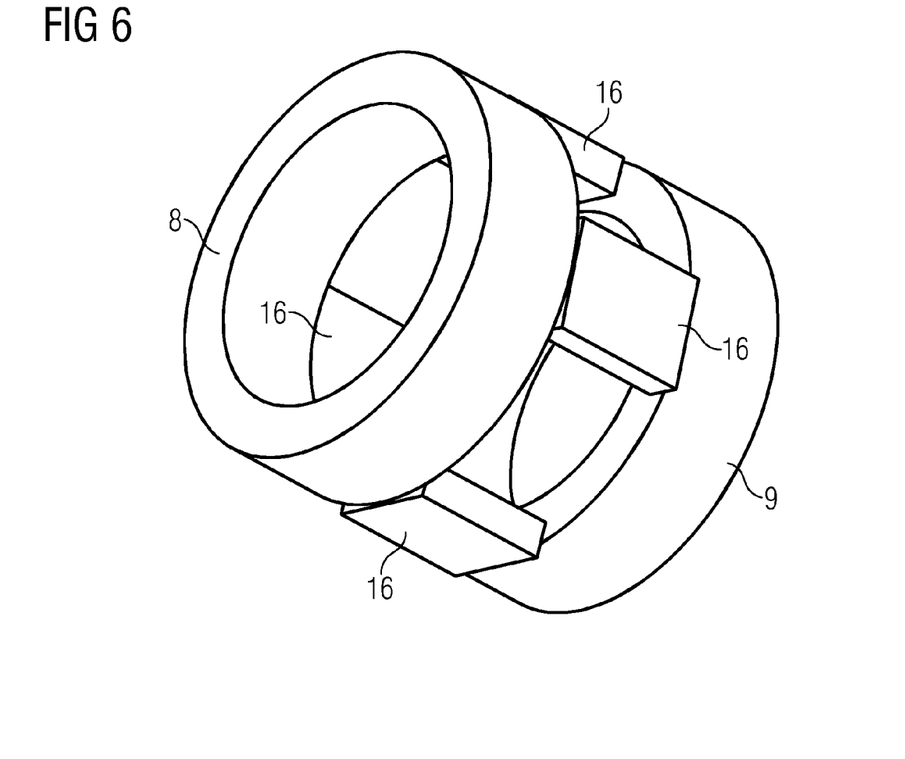
FIG. 6 shows the stator without windings.

FIG. 6 shows the stator 3 without windings 10. Therefore, ferromagnetic connecting pieces 16 can be seen between the two rings 8 and 9, which represent the cores of the electromagnets. Each of the connecting pieces 16 has an approximately cuboidal shape and extends in the axial direction from one ring 8 to the other ring 9. There are consequently a plurality of continuous ferromagnetic bridges between the two rings 8 and 9.

Figure 7:
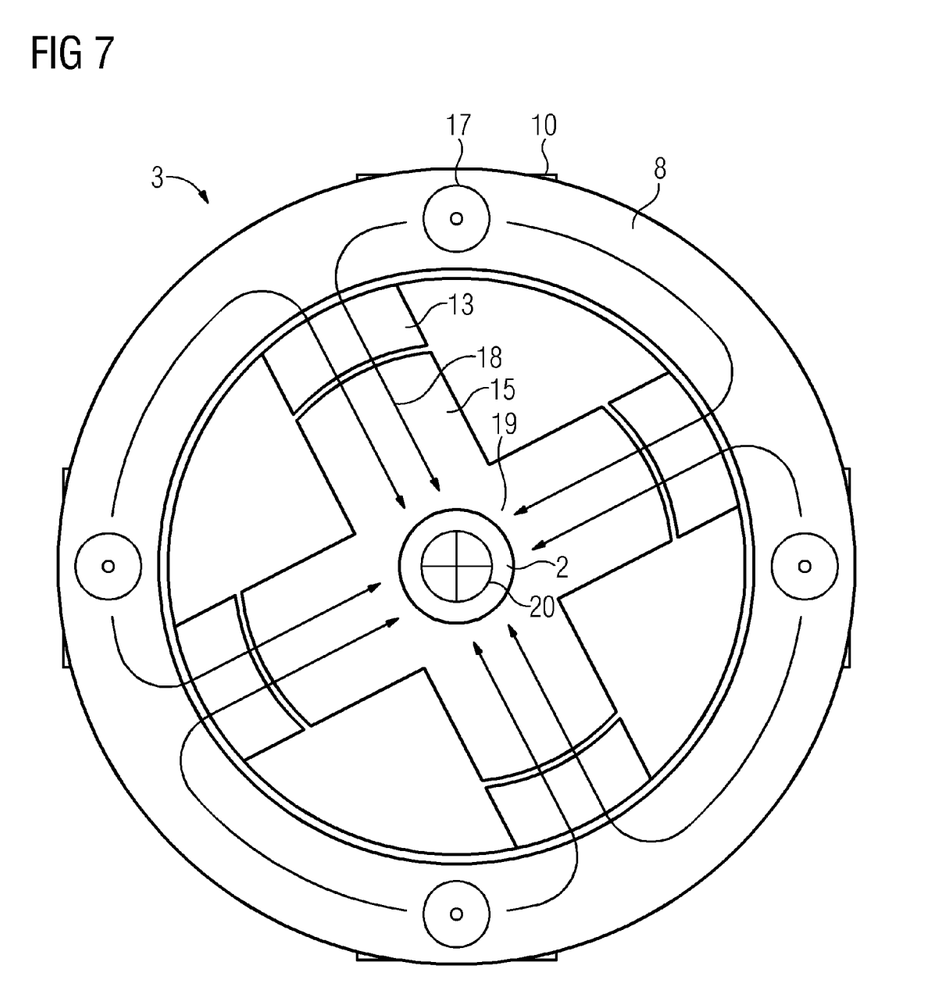
FIG. 7 shows a view of the end face of the magnetic reluctance coupling with lines of magnetic field strength.
Figure 8:
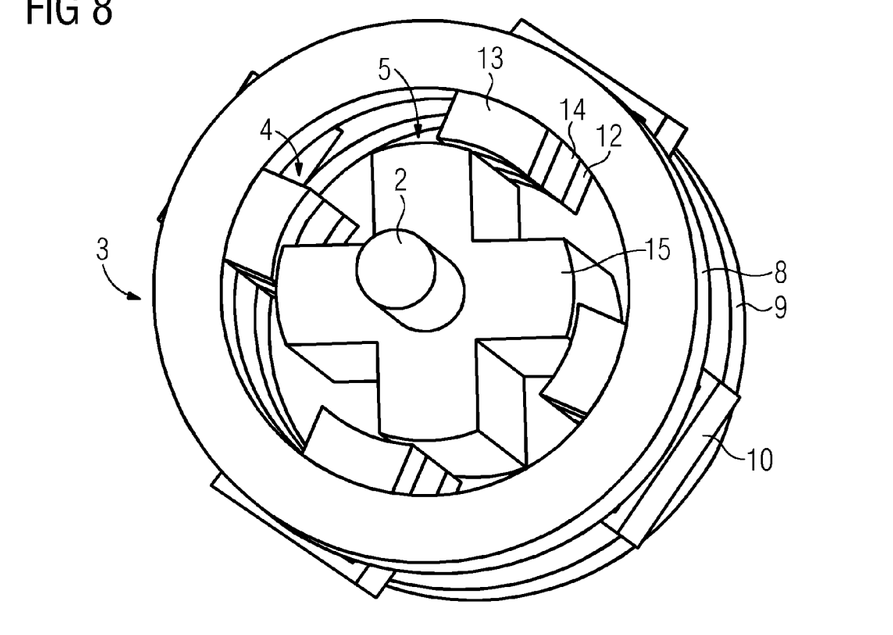
FIG. 8 shows a view of the magnetic reluctance coupling of FIG. 1 and FIG. 2 toward an end face in a position of the rotors with relatively great magnetic resistance and FIG. 9 shows a position of the rotors with minimal magnetic resistance.
Figure 9:
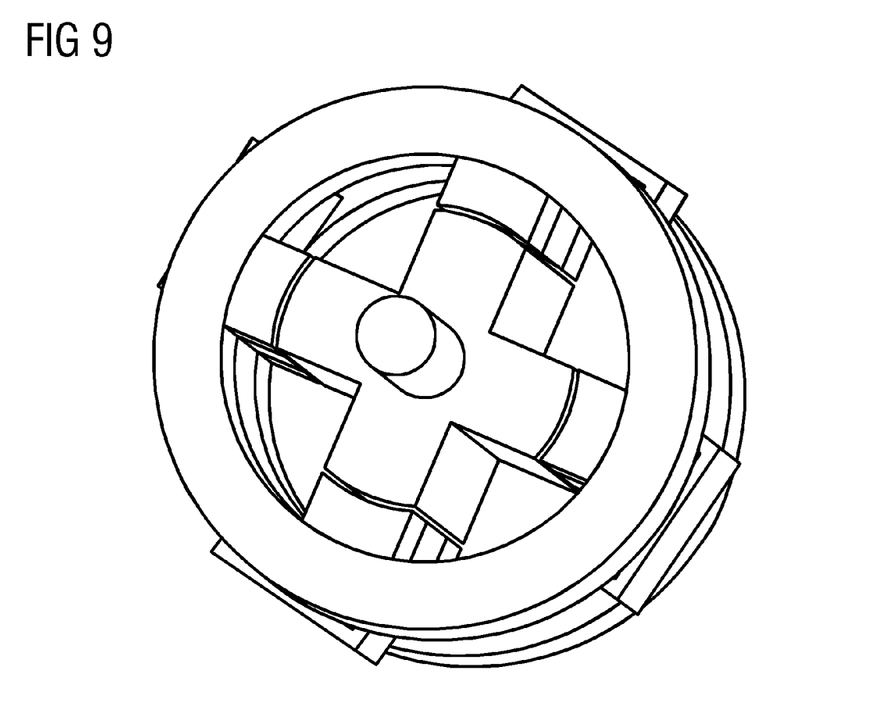

The operating principle of the magnetic reluctance coupling is now explained in more detail on the basis of FIGS. 7 to 9. FIG. 7 shows the view of the end face of the coupling. The stator 3 with the ring 8 can be seen, in the interior of which runs the outer, first rotor 4, of which subportions 13 can be seen. Of the inner, second rotor 5, the second portions 15 can be seen. Also depicted is the second shaft 2.

Electromagnets (symbolized by the windings 10) respectively have the effect of generating a magnetic field, which with the chosen pole direction are directed out of the plane of the drawing. Accordingly, the lines of magnetic field strength according to the symbols 17 of the respective electromagnet run into the ring 8. There, the lines of magnetic field strength are deflected in the circumferential direction. They run there as far as the next subportion 13 of the first rotor. By this respective subportion 13, the lines of magnetic field strength are deflected radially inwardly.

In the example of FIG. 4, the second portions 15 of the inner rotor 5 are exactly opposite the respective first portions 11 or subportions 13 of the first rotor 4. Therefore, the lines of magnetic field strength 18 run in the radial direction through the second rotor in the central portion 19 thereof, in which all of the second portions 15 run into one another. In the central portion 19, the lines of magnetic field strength run in a direction into the plane of the drawing, as the symbol 20 indicates.

The lines of magnetic field strength run further along the axis 6 to the other end of the second rotor 5. There, they are deflected radially outwardly into the second portions 15. They then pass through the first subportions 12 of the first portions 11 of the first rotor 4 in the radial direction to the outside. Finally, they enter the rings 9 lying radially thereabove, from which they are returned into the respective electromagnet.

The magnetic reluctance coupling is therefore based on a DC field, which is generated by one or more coils 10 with a corresponding winding direction in the ferromagnetic circuit. The circuit is formed by the stator 3 and the two rotors 4 and 5, which are respectively connected to a side of the shafts 1, 2.

If there is no current flowing through the coil(s) 10, and as a result the ferromagnetic circuit is field-free in first approximation, there is also no torque transmitted between the shafts 1, 2. If, however, there is a suitable DC current flowing through the coil(s) 10, a DC field is generated, completed by way of the two rotors 4, 5.

Depending on the position of the teeth (i.e. the portions 11 and 15) of the rotors 4, 5 in relation to one another, the air gap or the magnetic resistance of the arrangement changes, as emerges from FIGS. 8 and 9. The reluctance principle states that such an arrangement will have the tendency to keep the air gap or the magnetic resistance as small as possible, which is technically utilized for example in reluctance motors or magnetic bearings. In the position of the first rotor 4 with respect to the second rotor 5 that is represented in FIG. 8, for example, this has the effect that, when a field is applied, a force acts and exerts a torque on the shafts 1, 2, in order to rotate corresponding rotor teeth or portions of the two rotors 4, 5 into the same angular position.

As already mentioned, the number of teeth of the rotors 4 and 5 may also be other than four. The outer rotor 4 and the inner rotor 5 preferably have the same number of teeth. This is not absolutely necessary however.

The stator 3 has at least one magnetic connection between the one ring 8 and the other ring 9 by way of a magnet. A plurality of connections may also be realized however, then preferably being respectively formed by electromagnets. There is no relationship between the number of teeth of the rotors and the number of connections or magnets in the stator 3.

All of the windings are expediently flowed through by the same current and constructed with the same winding direction, in order that the fields are cumulative. In principle, the windings may however also be differently activated, in order for example to compensate for additional forces.

The arrangement presented above provides a simple magnetic coupling that can be activated by way of a DC current and does without rotating permanent magnets. This represents a significant cost advantage.

In addition, the stator and the rotors may also be constructed from solid parts, depending on the rotational speed required. For higher rotational speeds, it may be necessary for some of the components, such as for instance the stator rings, to be made in a laminated manner.

As compared with arrangements having rotating permanent magnets and a switchable rotary field, the advantage of the solution is that neither a converter nor sliding contacts for generating a rotating AC field are necessary. A simply generated DC field suffices.

If the two shafts are to be decoupled, the electromagnets must be deenergized. However, in order to achieve complete decoupling, an actual field-free state of the magnetic circuit must be ensured. For this purpose, any remanence must be specifically reduced by suitable current pulses. With the current pulses, the current must be directed in such a way that the field in the core is reversed.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A magnetic reluctance coupling for coupling a first shaft to a second shaft, the magnetic reluctance coupling comprising:
a hollow-cylindrical stator including one or more magnets that are arranged around a circumference of the stator, wherein the stator includes two coaxial ferromagnetic rings and the one or more magnets are arranged between the two coaxial ferromagnetic rings;
a first rotor that is mounted inside the stator and is configured to rotate within the stator, the first rotor being fixed to the first shaft and configured to rotate with the first shaft, the first rotor including a plurality of ferromagnetic first portions that are arranged around a circumference of the first rotor and are separated from one another; and
a second rotor that is mounted inside the first rotor and is configured to rotate within the first rotor, the second rotor being fixed to the second shaft and configured to rotate with the second shaft, the second rotor including a plurality of ferromagnetic second portions that are arranged around a circumference of the second rotor;
wherein each of the ferromagnetic first portions of the first rotor is formed as a bar having three subportions, a first subportion of each bar being formed of ferromagnetic material and being arranged along an inner circumference of one of the two coaxial ferromagnetic rings, a second subportion of each bar being formed of ferromagnetic material and being arranged along an inner circumference of the other one of the two ferromagnetic rings, and a third subportion of each bar being formed of a non-magnetic material and being arranged axially between the first subportion and the second subportion.

2. The magnetic reluctance coupling as claimed in claim 1, wherein each of the one or more magnets are electromagnets.

3. The magnetic reluctance coupling as claimed in claim 2, wherein the stator includes two coaxial ferromagnetic rings and the one or more magnets are arranged between the two coaxial ferromagnetic rings, and each of the one or more electromagnets has a ferromagnetic core that acts as a connecting piece between the two coaxial ferromagnetic rings, so that there is an uninterrupted ferromagnetic connection between the two coaxial ferromagnetic rings.

4. The magnetic reluctance coupling as claimed in claim 1, wherein the first rotor includes a disk-shaped holding element, the first shaft being fastened to a first side of the holding element and each of the bars being fastened to a second side of the holding element that is opposite the first side.

5. The magnetic reluctance coupling as claimed in claim 1, wherein an axial length of the first rotor, an axial length of the second rotor, and an axial length of the stator are the same.

6. The magnetic reluctance coupling as claimed in claim 1, wherein the ferromagnetic second portions of the second rotor are arranged in star form around an axis of rotation of the second rotor.

7. The magnetic reluctance coupling as claimed in claim 1, wherein a number of the plurality of ferromagnetic first portions is equal to a number of the plurality of ferromagnetic second portions.

8. The magnetic reluctance coupling as claimed in claim 4, wherein each of the bars extends longitudinally from the second side of the holding element and a longitudinal axis of each of the bars is parallel to an axis of rotation of the first shaft.

9. The magnetic reluctance coupling as claimed in claim 8, wherein each of the bars is divided into the three subportions along the longitudinal axis.

10. The magnetic reluctance coupling as claimed in claim 1, wherein the second rotor is formed as a single piece such that each of the ferromagnetic second portions merge together at a center portion of the second rotor that has a same axis of rotation as an axis of rotation of the second shaft.

11. The magnetic reluctance coupling as claimed in claim 1, wherein the one or more magnets do not protrude into an interior of the stator, the interior of the stator being defined by a cylinder that is bounded by inner surfaces of the two coaxial ferromagnetic rings.

12. A coupling arrangement comprising:
a hollow-cylindrical stator including one or more magnets that are arranged around a circumference of the stator;
a first rotor that is mounted inside the stator and is configured to rotate within the stator, the first rotor being fixed to the first shaft and configured to rotate with the first shaft, the first rotor including a plurality of ferromagnetic first portions that are arranged around a circumference of the first rotor and are separated from one another; and
a second rotor that is mounted inside the first rotor and is configured to rotate within the first rotor, the second rotor being fixed to the second shaft and configured to rotate with the second shaft, the second rotor including a plurality of ferromagnetic second portions that are arranged around a circumference of the second rotor; and
a control device configured to activate a coupling-engaging state in which a first magnetic field in the first and second rotors is directed in a first direction and, immediately after ending the coupling-engaging state by current pulses, a second magnetic field in the first and second rotors is formed in a second direction opposite to the first direction to demagnetize the first and second rotors;
wherein each of the ferromagnetic first portions of the first rotor is formed as a bar having three subportions, a first subportion of each bar comprising ferromagnetic material arranged along an inner circumference of one of the two coaxial ferromagnetic rings, a second subportion of each bar comprising ferromagnetic material arranged along an inner circumference of the other one of the two ferromagnetic rings, and a third subportion of each bar comprising a non-magnetic material arranged axially between the first subportion and the second subportion.

* * * * *